Nov. 20, 1934.  E. F. LOWEKE  1,981,653
HYDRAULIC BRAKING APPARATUS
Filed Jan. 22, 1932  2 Sheets-Sheet 1
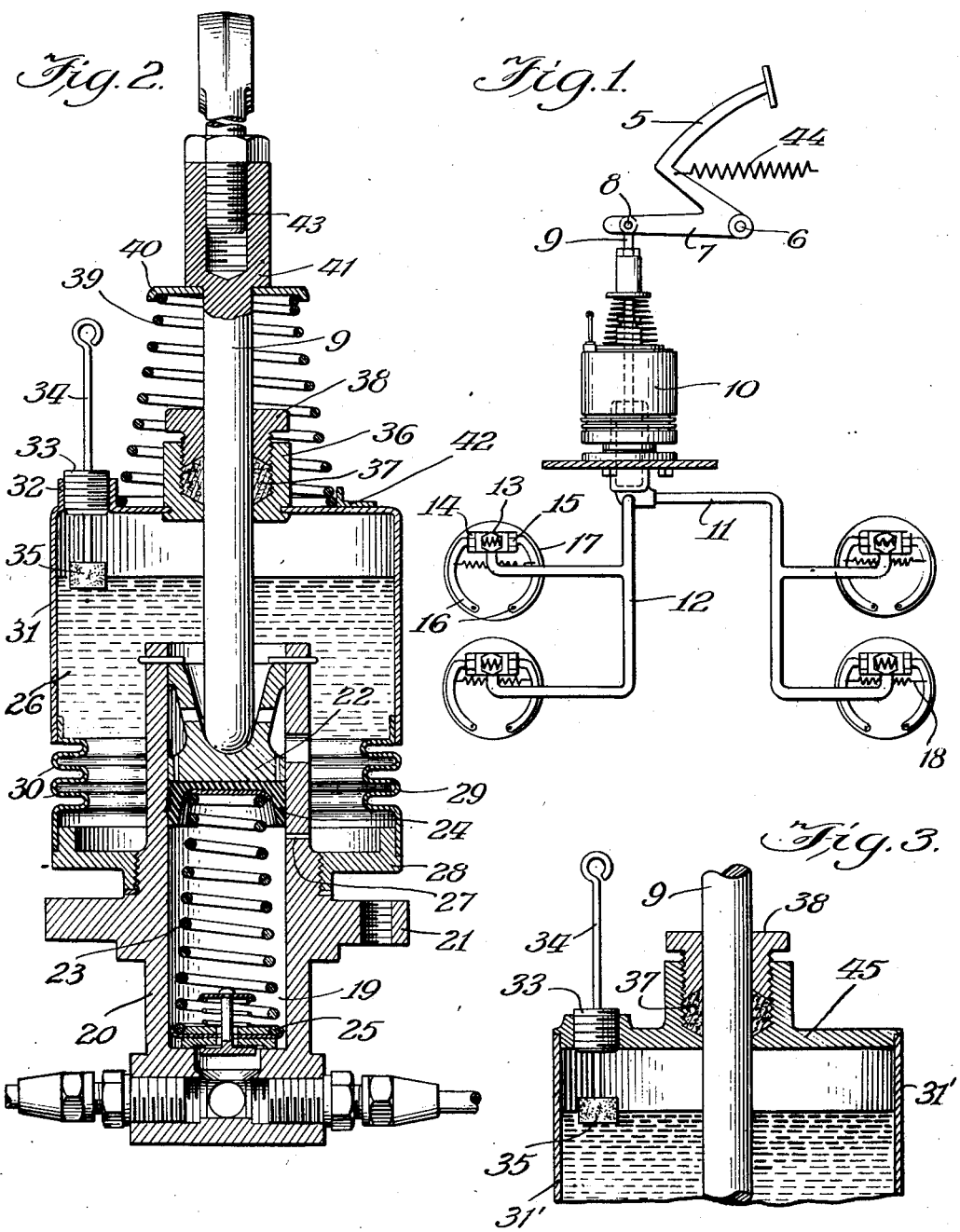

Nov. 20, 1934.  E. F. LOWEKE  1,981,653
HYDRAULIC BRAKING APPARATUS
Filed Jan. 22, 1932   2 Sheets-Sheet 2

Inventor
Erwin F. Loweke.
By Williams, Bradbury,
McCaleb & Hinkle
Attys.

Patented Nov. 20, 1934

1,981,653

UNITED STATES PATENT OFFICE

1,981,653

HYDRAULIC BRAKING APPARATUS

Erwin F. Loweke, Detroit, Mich., assignor to Hydraulic Brake Company, Detroit, Mich., a corporation of California Application January 22, 1932, Serial No. 588,045

6 Claims. (Cl. 60—54.6)

My invention pertains to hydraulic brake apparatus and is more particularly concerned with the structure of the compressor and fluid supply therefor.

An object of my invention is to provide new and improved hydraulic braking apparatus.

Another object is to provide hydraulic braking apparatus which will be cheaper to manufacture than that now in use.

Another object is to provide a combined cylinder and reservoir unit having a flexible mounting for the reservoir.

Another object is to provide a flexible reservoir.

Another object is to provide a master cylinder and reservoir unit having a vertically arranged master cylinder and an adequate closure for the upper end of the reservoir.

Another object is to provide an anti-splash device.

Other objects and advantages will become apparent as the description proceeds.

In the drawings, Fig. 1 is a diagrammatic view of a hydraulic brake system incorporating my invention;

Fig. 2 is an enlarged sectional elevation of the reservoir and master cylinder shown in Fig. 1;

Fig. 3 is a partial view similar to Fig. 2 but showing a different arrangement for the top of the reservoir.

Figure 4:
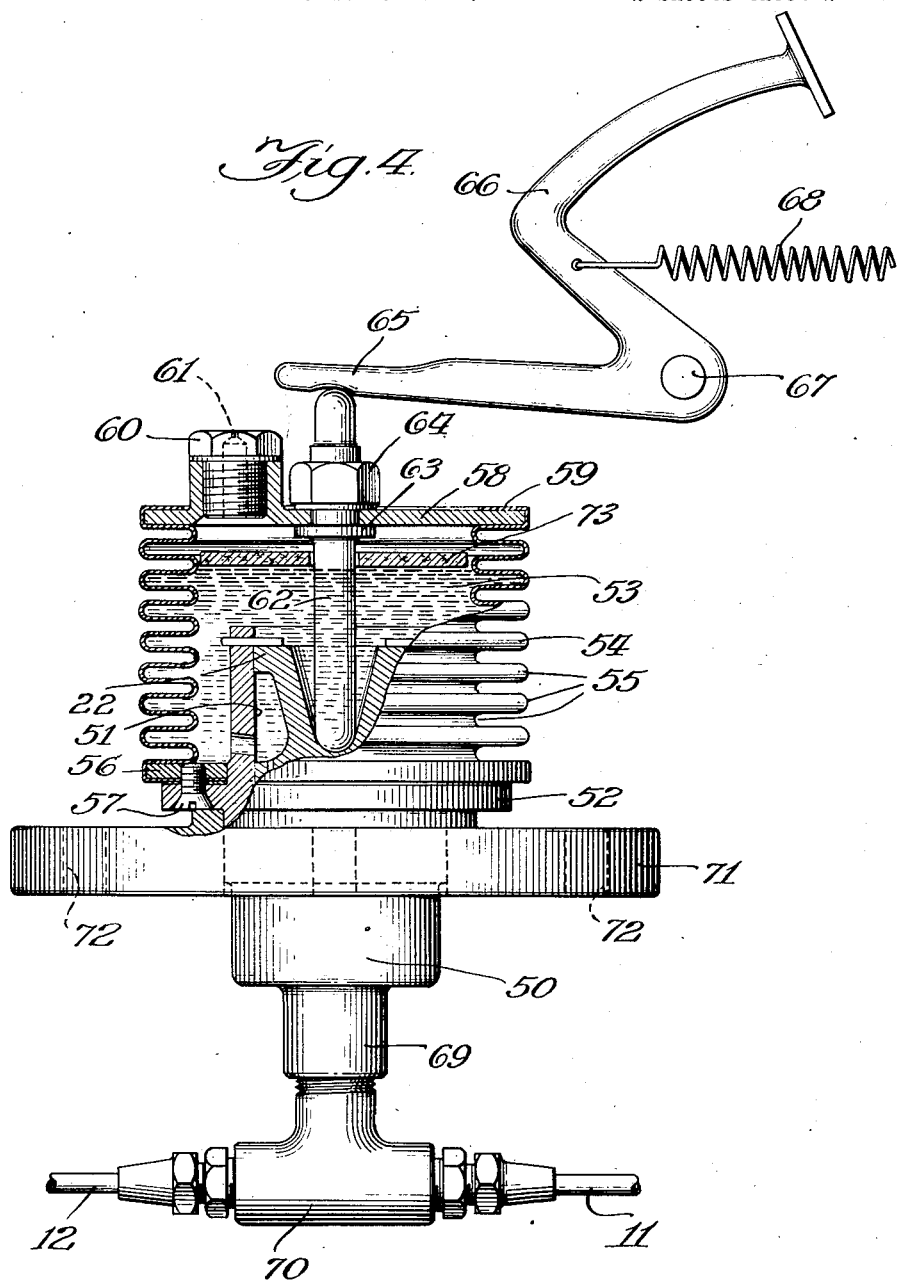
Fig. 4 is an elevation partly in section, of another embodiment of my invention.

In the drawings 5 represents a brake pedal pivoted at 6 to the frame or other suitable part of an automotive vehicle. The pedal 5 has an arm 7 connected at 8 to the piston rod 9 of a master cylinder and reservoir unit indicated generally by reference numeral 10. This unit discharges into conduits 11 and 12 leading to motor cylinders 13 commonly located at the vehicle wheels. Each cylinder 13 has opposed pistons 14 and 15 for operating the brake shoes 16 to force them into engagement with the brake drums 17. Brake shoes 16 are retracted by springs 18.

The structure of the unit 10 is shown more clearly in Fig. 2 and comprises a master cylinder 19 formed in a casting 20 provided with lugs 21 by means of which the casting may be attached to the vehicle frame or a suitable bracket attached thereto. In the master cylinder is located a piston 22 operated in one direction by the piston rod 9 and in the opposite direction by a spring 23 which is interposed between the rubber cup 24 associated with the piston 22 and a valve mechanism 25 of the type disclosed in United States Patent No. 1,758,671. In the normal or rest position of the piston a cylinder 19 communicates with the interior of reservoir 26 through port 27.

A flange 28 is threadedly secured to casting 20 and forms the base for the reservoir 26. Soldered or otherwise secured to the flange 28 is a ring 29 of brass or any other suitable metal, which may be easily worked and which will not crack or crystallize under repeated flexing. The metal of this ring 29 is bent back and forth on itself to form folds 30 which greatly increase the flexibility of the ring 29.

The upper part of the reservoir 26 may be formed of ordinary sheet metal 31 which is soldered or otherwise suitably secured to the upper end of the ring 29. The sheet metal 31 is punched out as indicated at 32, to receive a threaded tubular member 33 through which passes the stem of a level indicator 34 which has a float 35 at its lower end. There is sufficient clearance between the stem of the indicator and the bore in the member 33 to form a vent whereby the contents of the reservoir is maintained under atmospheric pressure.

A packing gland 36 is secured to the upper end of the sheet metal portion 31 and contains packing material 37 of any well-known type, which is pressed against the piston rod 9 by tubular nut 38.

The upper end of the reservoir supports a return spring 39 which acts on a washer 40 resting against a shoulder 41 formed on connecting rod 9. Guiding means 42 may be secured to the upper end of the reservoir to center the lower end of the spring 39. The upper end of the piston rod 9 is provided with a threaded adjustment, as indicated at 43.

In Fig. 1 I have shown an additional spring 44 which assists the spring 39 to return the foot pedal 5 and piston rod 9 to normal position. In most instances it will not be necessary or desirable to use two springs for this purpose and either the spring 44 or the spring 39 may be eliminated, as found most convenient in applying my braking system to any particular vehicle.

In the embodiment shown in Fig. 3 the top of the reservoir is formed as a separate casting 45 which is soldered or otherwise secured to the sheet metal 31'. The lower end of the sheet metal ring 31' is soldered to the ring 29 as in the previous embodiment.

The master cylinder and reservoir unit are preferably so located relative to the pedal 5 that the piston rod 9 is in axial alignment with the cylinder 19 when the brake system is at rest. When pressure is applied to the brake pedal 5 this pedal pivots about the point 6 and forces piston rod 9 and piston 22 downwardly, thereby expelling fluid from the cylinder 19 and forcing it through conduits 11 and 12 to actuate the motor cylinders and braking elements associated therewith. As the piston rod 9 is forced downwardly, its upper end moves out of axial alignment with the cylinder 19 and the entire piston rod assumes an angular relationship with respect to the axis of said cylinder.

The packing gland 36 permits no relative sidewise movement between the piston rod and the front end of the reservoir so that the upper end of the reservoir moves with the piston rod as it swings out of axial alignment with the cylinder 19, and the flexible ring 29 yields sufficiently to permit this lateral movement of the upper end of the reservoir. The piston rod 9 pivots about its point of connection with piston 22 and by placing the flexible ring 29 adjacent or below this point the amount of distortion to which this ring is subjected is reduced to a minimum.

In Fig. 4 I have shown a master cylinder casting 50 having a bore 51 in which the piston 22 reciprocates. The lower end of the cylinder bore is not shown but is adapted to contain spring 23, packing cup 24, and valve 25 in the same arrangement in which these parts are located in the cylinder shown in Fig. 2. In this Fig. 4 the master cylinder casting includes a flange 52. The fluid reservoir 53, from which the master cylinder receives its supply of fluid, has its side wall 54 composed of resilient sheet-metal which is bent back and forth upon itself to provide folds 55. The lower end of the wall 54 is clamped between a ring 56 and the flange 52 to which the ring 56 is secured as by studs 57.

A top 58, which is preferably of heavier metal than the wall 54, is secured to the upper end of the wall by crimping over the metal of the wall, as indicated at 59. The top 58 carries a removable filling plug 60 which contains a small vent 61 by means of which the fluid in the reservoir is maintained under atmospheric pressure at all times.

The piston 22 is reciprocated to discharge fluid from the master cylinder by a piston rod 62 which is firmly attached to the head 58 by means of flange 63 and nut 64. The upper end of the piston rod 62 is preferably rounded and is shown as forming a separable contact connection with the flattened end 65 of a foot-pedal 66 suitably pivoted at 67. The wall 54 of the reservoir is compressed during each application of pressure to the foot-pedal 66 and the resiliency of the folded sheet-metal, which forms the wall 54, is sufficient to return the reservoir and piston rod 62 to initial position. In most instances this resiliency will also be sufficient to return the foot-pedal to initial position but in some instances it may be desirable to utilize a spring 68 to return the foot-pedal 66.

In order to prevent splashing of fluid in the reservoir and the resultant escape therefrom of some fluid through the vent 61, I provide a float 73 of cork or other suitable material which serves as an anti-splash device. This float 73 is made slightly smaller than the inner diameter of the folds 55 and has a central opening through which the piston rod 62 passes. This central opening is sufficiently larger than the piston rod to prevent binding between the piston rod and the float, but at the same time this central opening acts as a guide for the float and prevents it from being caught in the folds 55 as the folds compress and expand upon each application of the brakes.

In this form of my invention the master cylinder 50 is provided with a boss 69 at its lower end and into this boss is threaded a pipe T 70. The conduits 11 and 12 which lead to the brake actuating cylinders, are secured to the T 70 by any suitable type of connection. The master cylinder is supported by a bracket 71 which may be secured to the vehicle frame or other suitable support by means of bolt holes 72.

The operation of the embodiment shown in Fig. 4 is generally similar to that of the embodiments previously described and need not be further described herein.

Having thus illustrated and described two preferred embodiments of my invention, I wish it to be understood that my invention may take various other forms and is not to be limited to the details of the embodiments disclosed herein, but the scope of my invention is to be limited solely by the following claims.

I claim:

1. In mechanism of the class described, the combination of a master cylinder, a rigid support therefor, a piston reciprocable in said cylinder, a piston rod for said piston, said rod and piston having a pivotal connection, means for advancing said rod and for moving it about said pivotal connection, and a reservoir communicating with said cylinder, said reservoir including a base rigid with said cylinder, a top closely fitting said piston rod and laterally movable therewith, and a resilient wall connecting said top and said base and permitting relative angular movement therebetween.

2. In a hydraulic brake system, the combination of a casting having a part adapted to be attached to a support, said casting providing a cylinder therein, a reservoir carried by said casting, means connecting said reservoir with said cylinder, a piston reciprocable in said cylinder, a piston rod for reciprocating said piston, said piston rod having a laterally movable end, means for reciprocating said rod and moving said end thereof laterally, a packing gland for said piston rod forming a part of said reservoir, and flexible means permitting lateral movement of a part of said reservoir with said piston rod.

3. In a mechanism of the class described, the combination of a vertical master cylinder, a piston reciprocable therein, a piston rod for reciprocating said piston, said piston rod being movable from a position in which said piston rod is substantially coaxial with said cylinder to a second position in which said piston rod is at an angle to the axis of said cylinder, means for so moving said piston rod, a packing gland rigidly connected to a part of said reservoir, said piston rod passing through said packing gland in fluid-tight relation therewith, and means permitting movement of said part of the reservoir in a direction normal to the axis of said cylinder.

4. In a hydraulic brake system, the combination of a master cylinder, a conduit connected thereto, a motor cylinder connected to said conduit, brake elements associated with said motor cylinder, a piston reciprocable in said master cylinder to apply said brake elements, a piston rod having one end associated with said piston and its other end connected for oscillating movement about a pivot offset from the axis of said master cylinder, a reservoir attached to said master cylinder, said reservoir having an upper portion forming a fluid-tight seal with said piston rod whereby said portion moves laterally upon each reciprocation of said rod and a flexible lower portion permitting lateral movement of said upper portion, means connecting said master cylinder and reservoir, and means for operating said piston rod.

5. In mechanism of the class described, a cylinder, a flange attached thereto, a section of angularly flexible material attached to said flange, a second section of sheet-metal attached to said first-named section, said sections forming a reservoir, a packing gland attached to said second section, a piston reciprocable in said cylinder, and an angularly movable piston rod for reciprocating said piston, said piston rod passing through said packing gland and creating angular movement in the upper part of said reservoir.

6. In mechanism of the class described, the combination of a master cylinder, a rigid support therefor, a piston reciprocable in said cylinder, a piston rod having a pivotal connection with said piston, means for reciprocating said rod and for moving one end thereof laterally, and a reservoir communicating with said cylinder, said reservoir including a part rigid with said cylinder, an angularly flexible wall, and a part having a laterally rigid connection with said piston rod whereby said part of the reservoir partakes of the lateral movement of said piston rod.

ERWIN F. LOWEKE.